United States Patent
Chu et al.

(10) Patent No.: US 11,979,870 B1
(45) Date of Patent: May 7, 2024

(54) QUIETING A WIRELESS LOCAL AREA NETWORK

(71) Applicant: Marvell Asia Pte Ltd, Singapore (SG)

(72) Inventors: Liwen Chu, San Ramon, CA (US); Yi-Ling Chao, Sunnyvale, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/114,790

(22) Filed: Feb. 27, 2023

Related U.S. Application Data (63) Continuation of application No. 16/886,678, filed on May 28, 2020, now Pat. No. 11,595,971.

(60) Provisional application No. 62/853,635, filed on May 28, 2019.

(51) Int. Cl.
*H04W 72/12* (2023.01)
*H04W 84/12* (2009.01)

(52) U.S. Cl.
CPC ............ *H04W 72/12* (2013.01); *H04W 84/12* (2013.01)

(58) Field of Classification Search
CPC .............................. H04W 72/12; H04W 84/12
USPC ....................................................... 370/329
See application file for complete search history.

(56) References Cited

U.S. PATENT DOCUMENTS

| | | |
|---|---|---|
| 9,532,311 B1 | 12/2016 | Chhabra et al. |
| 11,595,971 B1 * | 2/2023 | Chu ............... H04W 72/12 |
| 2003/0086437 A1 | 5/2003 | Beneveniste |
| 2005/0059347 A1 | 3/2005 | Haartsen |
| 2008/0279163 A1 | 11/2008 | Desai |
| 2014/0211659 A1 | 7/2014 | Abraham et al. |
| 2016/0053366 A1 | 2/2016 | Stowell et al. |

OTHER PUBLICATIONS

IEEE P802.11 ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

(Continued)

*Primary Examiner* — Angel T Brockman (57) ABSTRACT

A first communication device generates and transmits a frame that is configured to cause one or more second communication devices in a wireless local area network (WLAN) to refrain from transmitting during a set of repeating time segments, and the frame is generated to include an indication of a time period of the time segments in the set of repeating time segments, the time period being less than a duration of a beacon interval of the WLAN such that multiple ones of the time segments occur within one beacon interval. Alternatively, the frame is configured to cause one or more second communication devices in the WLAN to refrain from transmitting during a time segment that begins in conjunction with an end of transmission of i) the frame or ii) a packet that includes the frame, and the frame is generated to include an indication of a time duration of the time segment.

20 Claims, 6 Drawing Sheets

(56) References Cited

OTHER PUBLICATIONS

IEEE P802.11 ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

Zhang et al., "EHT Technology Candidate Discussions," doc: IEEE 802.11-18/1161r0, The Institute of Electrical and Electronics Engineers, Inc., pp. 1-10 (Jul. 8, 2018).

\* cited by examiner

First communication device generates frame configured to prompt one or more second communication devices to refrain from transmitting during one or more time segments, e.g., i) a single time segment that begins in conjunction with an end of transmission of the frame (or a packet that includes the frame), or ii) a set of repeating time segments, and the frame is generated to include an indication of a period of the time segments, the period being less than a duration of a beacon interval such that multiple ones of the time segments occur within one beacon interval
504

↓

First communication device transmits the frame to prompt the one or more second communication devices to refrain from transmitting during the one or more time segments
508

FIG. 6

QUIETING A WIRELESS LOCAL AREA NETWORK

CROSS REFERENCES TO RELATED APPLICATIONS

The present application is a continuation of U.S. application Ser. No. 16/886,678, filed on May 28, 2020, entitled "Quieting A Wireless Local Area Network," which claims the benefit of U.S. Provisional Patent Application No. 62/853,635, entitled "Access Point (AP) Power Save: Basic Service Set (BSS) Quiet Period," filed on May 28, 2019. Both of the applications referenced above are hereby incorporated by reference herein their entireties.

FIELD OF TECHNOLOGY

The present disclosure relates generally to wireless communication systems, and more particularly to quieting a wireless local area network.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN.

The current version of the IEEE 802.11 Standard (referred to herein as "the IEEE 802.11 Standard" for simplicity) provides a mechanism for quieting a WLAN for testing for the presence of a nearby radar system. For example, an access point (AP) transmits a "Quiet Element" that prompts all client stations in the WLAN to refrain from transmitting during a quiet period, and the AP makes various measurements (e.g., power measurements, detection of WLAN packets, a received power indicator histogram, etc.) during the quiet period for various purposes, such as to detect the presence of other WLANs, measure interference power, determine if a radar system is detected on a communication channel of the WLAN, etc. If the AP detects significant interference or a radar system, for example, the AP may instruct the client stations to move to a different communication channel.

SUMMARY

In an embodiment, a method for quieting transmissions in a wireless local area network (WLAN) includes: generating, at a first communication device, a frame that is configured to cause one or more second communication devices in the WLAN to refrain from transmitting during a set of repeating time segments, wherein the frame is generated to include an indication of a time period of the time segments in the set of repeating time segments, the time period being less than a duration of a beacon interval of the WLAN such that multiple ones of the time segments occur within one beacon interval; and transmitting, by the first communication device, the frame to cause the one or more second communication devices to refrain from transmitting during time segments within the set of repeating time segments.

In another embodiment, a first communication device comprises: a wireless network interface device having one or more integrated circuit (IC) devices configured to: generate a frame that is configured to cause one or more second communication devices in a WLAN to refrain from transmitting during a set of repeating time segments, wherein the frame is generated to include an indication of a time period of the time segments in the set of repeating time segments, the time period being less than a duration of a beacon interval of the WLAN such that multiple ones of the time segments occur within one beacon interval; and control the wireless network interface device to transmit the frame to cause the one or more second communication devices to refrain from transmitting during time segments within the set of repeating time segments.

In yet another embodiment, a method for quieting transmissions in a WLAN includes: generating, at a first communication device, a frame that is configured to cause one or more second communication devices in the WLAN to refrain from transmitting during a time segment that begins in conjunction with an end of transmission of i) the frame or ii) a packet that includes the frame, wherein the frame is generated to include an indication of a time duration of the time segment; and transmitting, by the first communication device, the frame to cause the one or more second communication devices in the WLAN to refrain from transmitting during the time segment.

In still another embodiment, a first communication device comprises: a wireless network interface device having one or more IC devices configured to: generate a frame that is configured to cause one or more second communication devices in a WLAN to refrain from transmitting during a time segment that begins in conjunction with an end of transmission of i) the frame or ii) a packet that includes the frame, wherein the frame is generated to include an indication of a time duration of the time segment; and control the wireless network interface device to transmit the frame to cause the one or more second communication devices in the WLAN to refrain from transmitting during the time segment.

DETAILED DESCRIPTION

The IEEE 802.11 Standard provides a procedure for quieting a wireless local area network (WLAN) (sometimes referred to herein as the "current 802.11 quieting procedure"). The current 802.11 quieting procedure generally permits an access point (AP) to set up periodic time segments in which client stations in the WLAN are to refrain from transmitting. In particular, the current 802.11 quieting procedure permits the AP to define a starting time of the periodic time segments, a period of the periodic time segments, and a duration of each time segment in the periodic time segments. The period is specified in units of beacon intervals and thus the shortest period that can be established is one beacon interval. A beacon interval generally corresponds to a time interval at which beacon frames are transmitted by the AP. The beacon interval is commonly set to a default of 100 milliseconds (ms).

The AP and/or client stations in a WLAN may also include wireless network interface devices for wireless communications in other networks, such as Bluetooth® networks. Transmissions in the WLAN may interfere with transmissions in the other network(s), and thus quieting the WLAN may be useful for coexistence with the other network(s). However, the current 802.11 quieting procedure is often not suitable for avoiding interference with Bluetooth® networks. For example, multiple Bluetooth® transmissions may occur within a single beacon interval, but the current 802.11 quieting procedure facilitates only one quieting interval per beacon interval. As another example, some Bluetooth® transmissions are aperiodic, but the current 802.11 quieting procedure is geared toward quieting at periodic intervals.

In some embodiments described below, methods for quieting a WLAN permit establishing multiple quieting time segments within a single beacon interval. In other embodiments, methods for quieting a WLAN involve transmitting a packet that prompts communication devices in a WLAN to quiet transmissions for a single time segment that begins in connection with an end of transmission of the packet; such methods may be useful for quieting the WLAN for aperiodic time segments, at least in some embodiments and/or scenarios.

Figure 1:
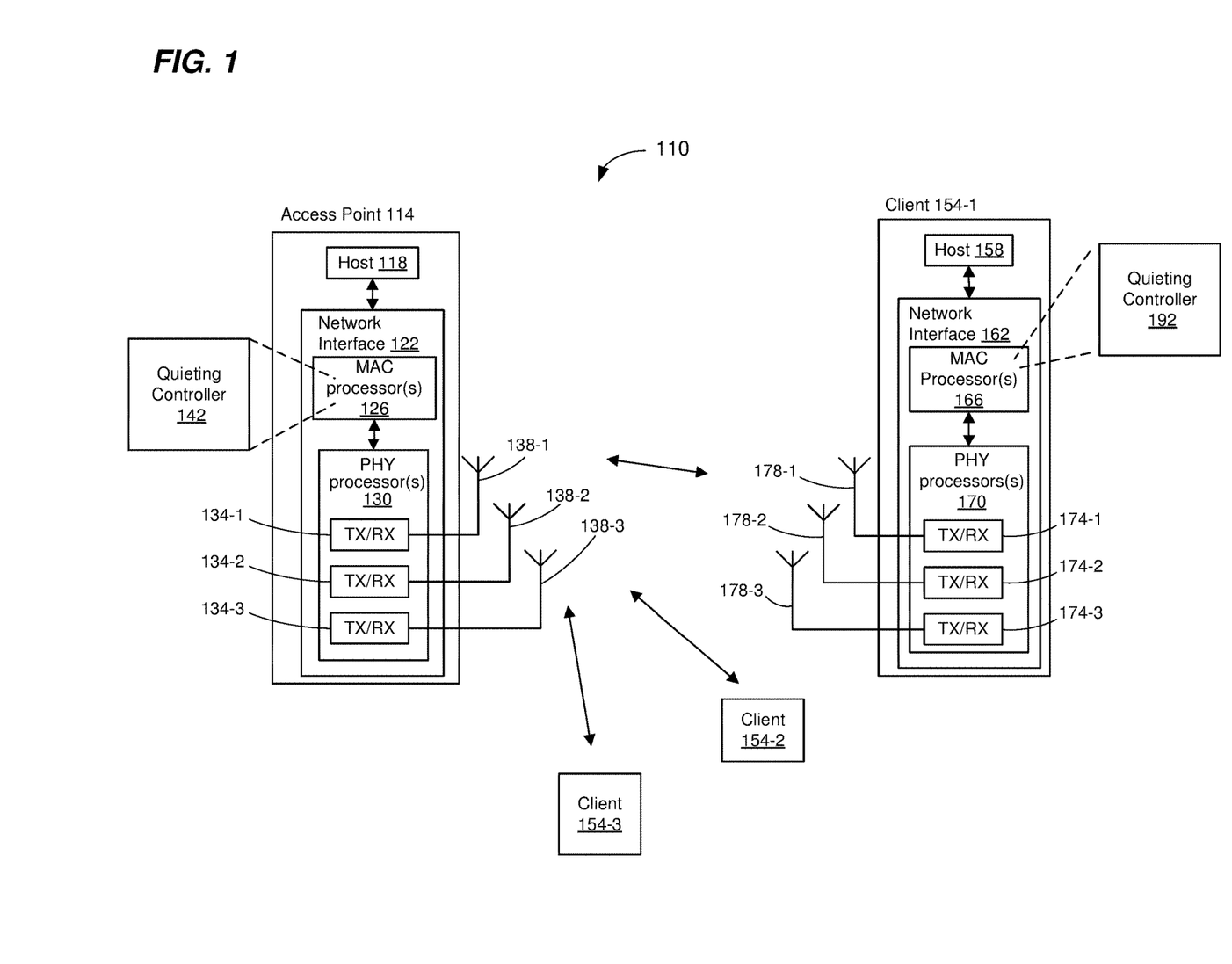
FIG. 1 is a block diagram of an example communication system in which an access point (AP) prompts client stations to refrain from transmitting during one or more time segments, according to an embodiment.

FIG. 1 is a diagram of an example WLAN 110 that uses one or more example quieting techniques described in more detail below, according to an embodiment. The WLAN 110 includes an AP 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In another embodiment, the wireless network interface device 122 is additionally configured for operation within two or more RF bands at the same time or at different times. For example, in an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands. In an embodiment, the wireless network interface device 122 includes a single MAC processor 126 corresponding to the multiple RF bands. In another embodiment, the wireless network interface device 122 includes multiple MAC processors 126, where respective MAC processors 126 correspond to respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The MAC processor 126 includes, or implements, a quieting controller 142. The quieting controller 142 is configured to control the wireless network interface device 122 to generate and transmit a packet that prompts client stations in the WLAN 110 to quiet transmissions during one or more time segments. In some embodiments, the quieting controller 142 generates quieting control information to be included in a packet for transmission to client stations. In some embodiments, the quieting control information is included in a frame within the packet, such as in a management frame (e.g., a beacon frame, a probe response frame, an association response frame, etc.), in a control frame (e.g., a quiet announcement frame or another suitable control frame), or another suitable frame generated by the MAC processor 126. The quieting control information includes information that indicates one or more time segments during which client stations in the WLAN 110 are to refrain from transmitting, such as a time duration of each time segment, and when the quieting control information corresponds to repeating time segments, a period of the time segments.

In an embodiment, the quieting controller 142 is implemented by a processor executing machine readable instructions stored in a memory, where the machine readable instructions cause the processor to perform acts described in more detail below. In another embodiment, the quieting controller 142 additionally or alternatively comprises one or more hardware state machines that are configured to perform acts described in more detail below.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes a single MAC processor 166 corresponding to the multiple RF bands. In another embodiment, the wireless network interface device 162 includes multiple MAC processors 166, where respective MAC processors 166 correspond to respective RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 166 includes, or implements, a quieting controller 192. The quieting controller 192 is configured to receive the packet (discussed above) that is configured to prompt client stations in the WLAN 110 to quiet transmissions during one or more time segments, and in response to receiving the packet, control the wireless network interface device 162 to quiet transmissions during the one or more time segments indicated by the packet. In some embodiments, the quieting controller 192 processes quieting control information in the packet, and determines the one or more time segments (during which the network interface device 162 is to quiet transmissions) using the quieting control information in the packet.

In an embodiment, the quieting controller 192 is implemented by a processor executing machine readable instructions stored in a memory, where the machine readable instructions cause the processor to perform acts described in more detail below. In another embodiment, the quieting controller 192 additionally or alternatively comprises one or more hardware state machines that are configured to perform acts described in more detail below.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
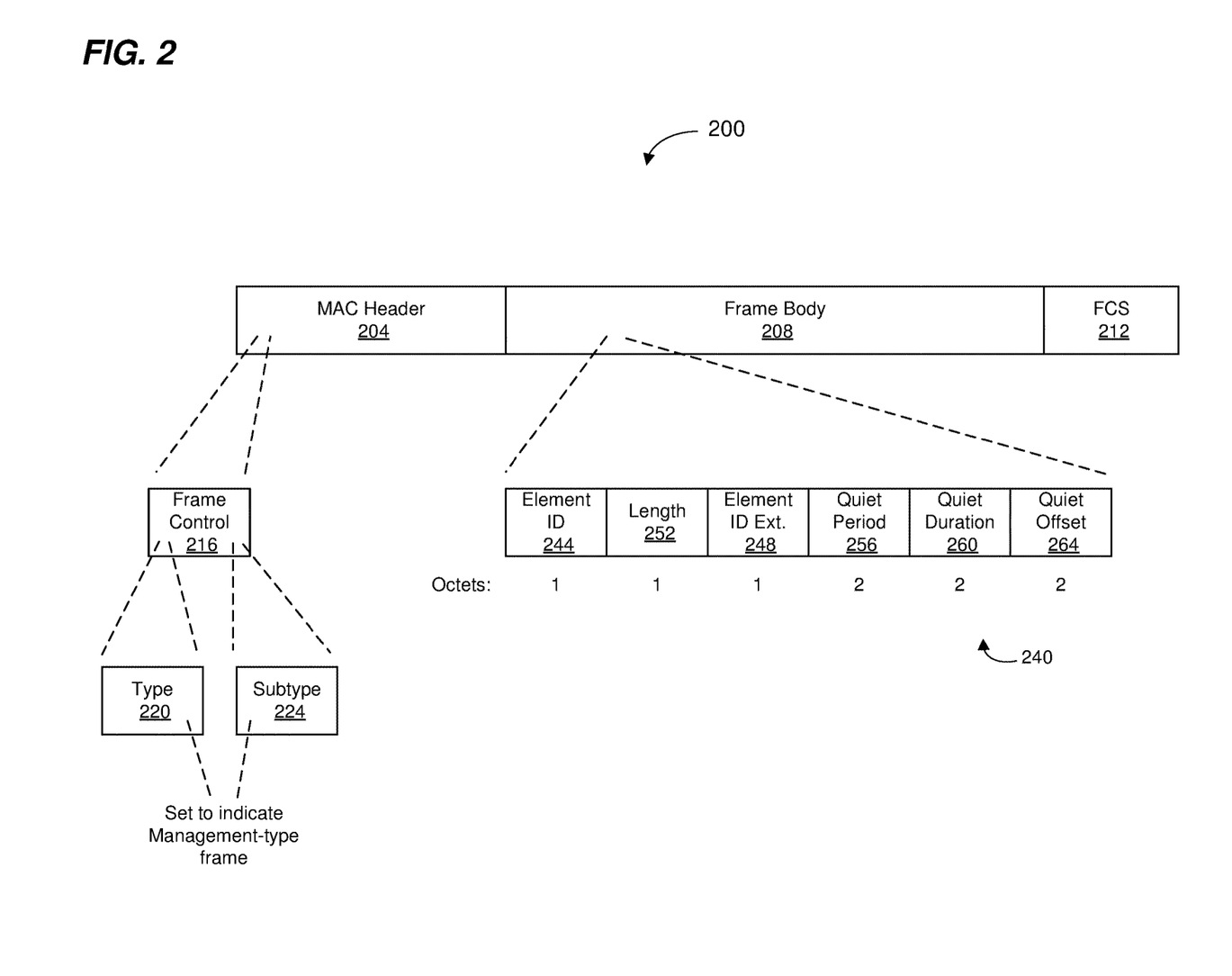
FIG. 2 is a diagram of an example frame that the AP of FIG. 1 is configured to generate and transmit to prompt client stations to refrain from transmitting during repeating time segments, according to an embodiment.

FIG. 2 is a diagram of an example management frame 200 that a communication device in a WLAN generates and transmits to quiet the WLAN, according to an embodiment. For example, the network interface device 122 of the AP 114 (FIG. 1) is configured to generate and transmit the management frame 200 to quiet the WLAN, according to an embodiment. For instance, the quieting controller 142 is configured to control the network interface device 122 to generate and transmit the management frame 200, according to an embodiment. The example management frame 200 is described with reference to FIG. 1 merely for explanatory purposes, and the management frame 200 is used with other suitable wireless communication networks and/or generated/transmitted/processed by other suitable wireless communication devices in other embodiments.

The management frame 200 is useful, for example, for establishing multiple quieting intervals within a single beacon interval, according to some embodiments. For instance, the management frame 200 includes quieting control information that indicates periodic time segments during which communication devices in the WLAN are to refrain from transmitting.

The management frame 200 includes a MAC header 204, a frame body 208, and a frame check sequence (FCS) field 212, according to an embodiment. The FCS field 212 includes error detection information (e.g., cyclic redundancy check (CRC) information) corresponding to the MAC header 204 and the frame body 208, according to an embodiment.

The MAC header 204 includes a frame control field 216 having MAC layer information regarding the management frame 200. The frame control field 216 includes a type subfield 220 set to indicate that the management frame 200 is a management-type frame. The frame control field 216 also includes a subtype subfield 224 set to indicate a subtype of the management frame 200. For example, the subtype subfield 224 is set to indicate that the management frame 200 is a beacon frame (a subtype of a management-type frame), according to an embodiment. As another example, the subtype subfield 224 is set to indicate that the management frame 200 is a probe response frame (a subtype of a management-type frame), according to an embodiment. As another example, the subtype subfield 224 is set to indicate that the management frame 200 is an association response frame (a subtype of a management-type frame), according to an embodiment. In other embodiments, the subtype subfield 224 is set to indicate another suitable subtype of a management-type frame.

The frame body 208 includes an information element (IE) 240 that includes quieting control information, according to an embodiment. The IE 240 is configured to prompt one or more communication devices in the WLAN to refrain from transmitting during periodic time segments indicated by the IE 240. For example, in response to a receiver determining that the frame 200 includes the IE 240, the receiver determines to refrain from transmitting during periodic time segments that indicated by quieting control information in the IE 240.

The IE 240 includes an information element identifier (sometimes referred to herein as an "element ID") field 244 and an element ID extension field 248, according to an embodiment. The element ID field 244 and the element ID extension field 248 are set to indicate that the IE 240 is a quieting control IE (having a particular format) that includes quieting control information. The IE 240 also includes a length field 252 that indicates a length of the IE 240.

The IE 240 further includes a quiet period field 256, a quiet duration field 260, and a quiet offset field 264, which generally indicate periodic time segments during which communication devices in the WLAN are to refrain from transmitting. The quiet period field 256 indicates (e.g., specifies) a period at which the respective time segments occur, e.g., a time duration between the respective start times of adjacent (in time) time segments among the periodic time segments. In an illustrative embodiment, the quiet period field 256 is in units of Time Units (TUs), a measurement of time defined in the IEEE 802.11 Standard as equaling 1024 microseconds. In other embodiments, the quiet period field 256 is in other suitable units (such as units less than or equal to 5000 microseconds, less than or equal to 2000 microseconds, less than or equal to 1000 microseconds, less than or equal to 100 microseconds, etc.) suitable for specifying multiple periodic time segments that occur within a single beacon interval. In another illustrative embodiment, the quiet period field 256 is in units equaling 32 microseconds. In various embodiments, the quiet period field 256 is in suitable units less than one beacon interval, such as units less than or equal to 20% of the beacon interval, less than or equal to 10% of the beacon interval, less than or equal to 5% of the beacon interval, less than or equal to 2% of the beacon interval, less than or equal to 1% of the beacon interval, etc.).

The quiet duration field 260 indicates (e.g., specifies) a time duration of each time segment among the periodic time segments. In an embodiment, the quiet duration field 260 is in units of TUs. In other embodiments, the quiet duration field 260 is in other suitable units (such as units less than or equal to 1000 microseconds, less than or equal to 500 microseconds, less than or equal to 100 microseconds, less than or equal to 50 microseconds, less than or equal to 10 microseconds, etc.) suitable for specifying a duration of each time segment among multiple periodic time segments that occur within a single beacon interval. In another illustrative embodiment, the quiet duration field 260 is in units equaling 32 microseconds. In another illustrative embodiment, the quiet duration field 260 is in units equaling 1 microsecond.

The quiet offset field 264 indicates (e.g., specifies) a time duration between a target beacon transmit time (TBTT) and a starting time of the periodic time segments. In an embodiment, the quiet offset field 264 indicates (e.g., specifies) a time duration between an immediately previous TBTT and the starting time of the periodic time segments. In another embodiment, the quiet offset field 264 indicates (e.g., specifies) a time duration between a next TBTT and the starting time of the periodic time segments.

In an illustrative embodiment, the quiet offset field 264 is in units of TUs. In other embodiments, the quiet offset field 264 is in other suitable units (such as units less than or equal to 1000 microseconds, less than or equal to 500 microseconds, less than or equal to 100 microseconds, less than or equal to 50 microseconds, less than or equal to 10 microseconds, etc.) suitable for specifying a duration of each time segment among multiple periodic time segments that occur within a single beacon interval. In another illustrative embodiment, the quiet offset field 264 is in units equaling 32 microseconds. In another illustrative embodiment, the quiet offset field 264 is in units equaling 1 microsecond.

Although FIG. 2 illustrates a specific arrangement of, and example lengths of, fields within the IE 240, the fields within the IE 240 have different suitable lengths and/or are in a different suitable order, according to various embodiments. Similarly, the IE 240 includes one or more other suitable fields not shown in FIG. 2 and/or one or more of the fields 244, 248, 252, 256, 260, and 264 are omitted, in various embodiments.

In some embodiments, the network interface device 122 is configured to (e.g., the MAC processor 126 is configured to, the quieting controller 142 is configured to, etc.) generate and transmit the management frame 200, according to an embodiment.

In some embodiments, the network interface device 162 is configured to (e.g., the MAC processor 126 is configured to, the quieting controller 142 is configured to, etc.) process the management frame 200 and, in response to processing the management frame, control the network interface device 122 to refrain from transmitting during the periodic time segments indicated (e.g., specified) by quieting control information in the management frame 200, according to an embodiment.

Figure 3:
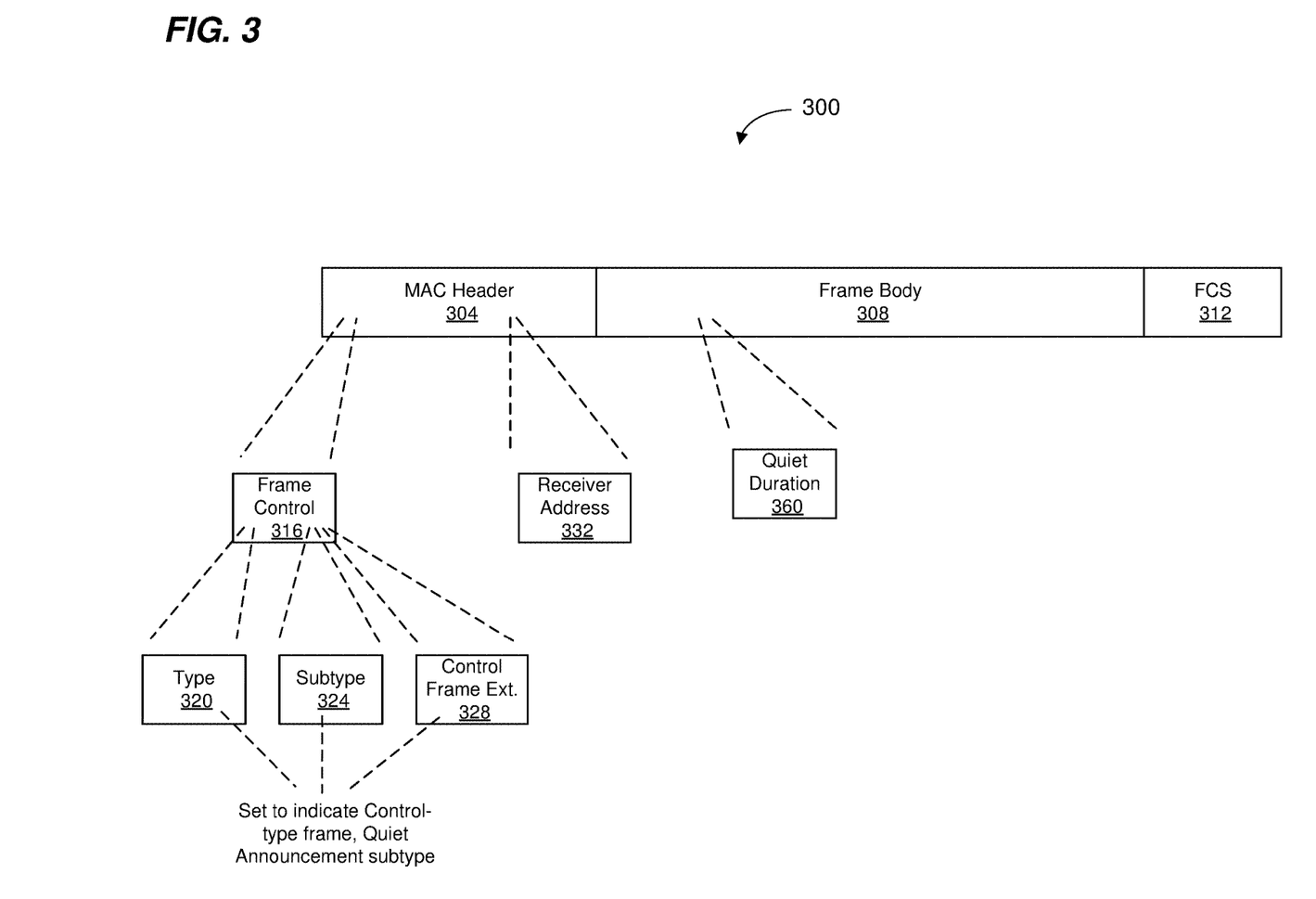
FIG. 3 is a diagram of another example frame that the AP of FIG. 1 is configured to generate and transmit to prompt client stations to refrain from transmitting during a time segment that begins in conjunction with an end of transmission of the frame or a packet that includes the frame, according to another embodiment.

FIG. 3 is a diagram of an example control frame 300 (referred to herein as a "Quiet Announcement frame") that a communication device in a WLAN generates and transmits to quiet the WLAN, according to another embodiment. For example, the network interface device 122 of the AP 114 (FIG. 1) is configured to generate and transmit the Quiet Announcement frame 300 to quiet the WLAN, according to an embodiment. For instance, the quieting controller 142 is configured to control the network interface device 122 to generate and transmit the Quiet Announcement frame 300, according to an embodiment. The example control frame 300 is described with reference to FIG. 1 merely for explanatory purposes, and the Quiet Announcement frame 300 is used with other suitable wireless communication networks and/or generated/transmitted/processed by other suitable wireless communication devices in other embodiments.

The Quiet Announcement frame 300 is useful, for example, for establishing a single time segment within a single beacon interval during which communication devices in a WLAN are to refrain from transmitting, according to some embodiments. For instance, the Quiet Announcement frame 300 includes quieting control information that indicates a single time segment during which communication devices in the WLAN are to refrain from transmitting. Multiple transmissions of Quiet Announcement frames 300 are used to establish multiple aperiodic time segments during which communication devices in a WLAN are to refrain from transmitting, according to some embodiments.

The Quiet Announcement frame 300 includes a MAC header 304, a frame body 308, and an FCS field 312, according to an embodiment. The FCS field 312 includes error detection information (e.g., CRC information) corresponding to the MAC header 304 and the frame body 308, according to an embodiment.

The MAC header 304 includes a frame control field 316 having MAC layer information regarding the Quiet Announcement frame 300. The frame control field 316 includes a type subfield 320 set to indicate that the Quiet Announcement frame 300 is a control-type frame. The frame control field 316 also includes a subtype subfield 324 and a control frame extension subfield 328 set to indicate that the control frame 300 is a Quiet Announcement subtype, according to an embodiment. In another embodiment, the control frame extension subfield 328 is omitted and the subtype subfield 324 is set to indicate that the control frame 300 is a Quiet Announcement subtype.

The MAC header 304 also includes an address field 332 that indicates an address of an intended receiver(s) of the Quiet Announcement frame 300. In an embodiment, the address field 332 is set to a broadcast address that indicates that the Quiet Announcement frame 300 is intended for all communication devices in the WLAN. A frame with an address field set to a broadcast address that indicates that the frame is intended for all communication devices in the WLAN is sometimes referred to as a "broadcast frame". In other embodiments, the address field 332 is set to a unicast address that indicates that the Quiet Announcement frame 300 is intended for a specific one communication device in the WLAN. A frame with an address field set to a unicast address that indicates that the frame is intended for a specific one communication device in the WLAN is sometimes referred to as a "unicast frame". In other embodiments, the address field 332 is set to a multicast address that indicates that the Quiet Announcement frame 300 is intended for a specific set of multiple communication devices in the WLAN, rather than all communication devices in the WLAN. A frame with an address field set to a multicast address that indicates that the frame is intended for a specific set of multiple communication devices in the WLAN is sometimes referred to as a "multicast frame".

The Quiet Announcement frame 300 is configured to prompt one or more communication devices in the WLAN to refrain from transmitting during a time segment that begins upon an end of transmission of the Quiet Announcement frame 300 (or an end of transmission of a packet that includes the Quiet Announcement frame 300) and lasts for a duration indicated by the Quiet Announcement frame 300 (e.g., in the frame body 308, as will be described below). For example, in response to a receiver determining that the frame 300 is a Quiet Announcement frame 300 (e.g., by analyzing the type subfield 320, the subtype subfield 324 and optionally the control frame extension subfield 328 (if included), the receiver determines to refrain from transmitting during a time segment that begins upon an end of transmission of the Quiet Announcement frame 300 (or an end of transmission of a packet that includes the Quiet Announcement frame 300) and lasts for a duration indicated by the Quiet Announcement frame 300 (e.g., in the frame body 308, as will be described below).

The frame body 308 includes quieting control information, such as a quiet duration field 360. The quiet duration field 360 indicates (e.g., specifies) a time duration of the time segment during which communication device(s) in the WLAN are to refrain from transmitting. In an illustrative embodiment, the quiet duration field 360 is in units of TUs. In other embodiments, the quiet duration field 360 is in other suitable units (such as units less than or equal to a TU, less than or equal to 1000 microseconds, less than or equal to 500 microseconds, less than or equal to 100 microseconds, less than or equal to 50 microseconds, less than or equal to 10 microseconds, etc.). In another illustrative embodiment, the quiet duration field 360 is in units equaling 32 microseconds. In another illustrative embodiment, the quiet duration field 360 is in units equaling 1 microsecond.

In some embodiments, the network interface device 122 is configured to (e.g., the MAC processor 126 is configured to, the quieting controller 142 is configured to, etc.) generate and transmit the Quiet Announcement frame 300, according to an embodiment.

In some embodiments, the network interface device 162 is configured to (e.g., the MAC processor 126 is configured to, the quieting controller 142 is configured to, etc.) process the Quiet Announcement frame 300 and, in response to processing the Quiet Announcement frame 300, control the network interface device 122 to refrain from transmitting during the time segment indicated (e.g., specified) by quieting control information in the Quiet Announcement frame 300, according to an embodiment.

Figure 4:
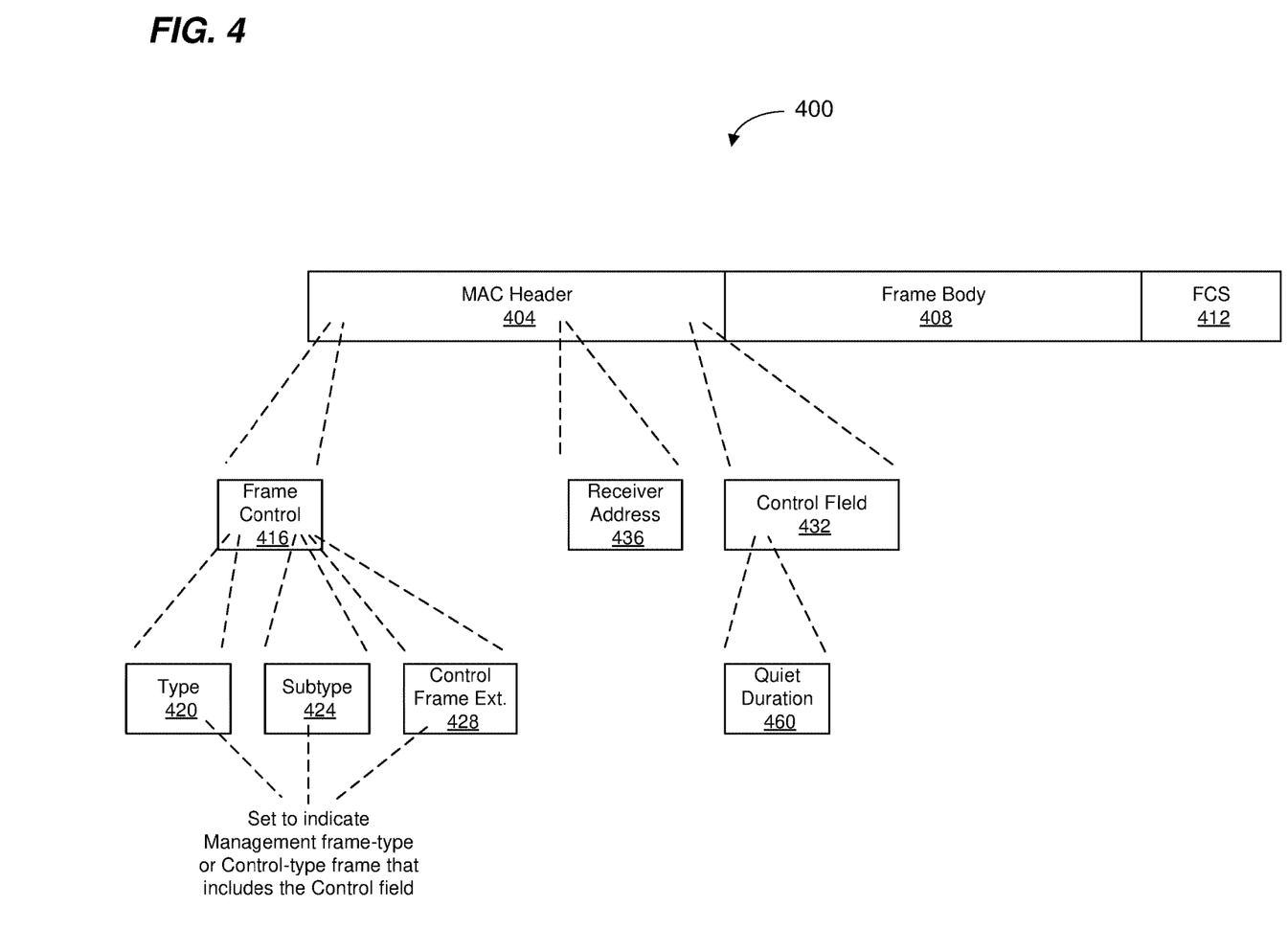
FIG. 4 is a diagram of another example frame that the AP of FIG. 1 is configured to generate and transmit to prompt client stations to refrain from transmitting during a time segment that begins in conjunction with an end of transmission of the frame or a packet that includes the frame, according to another embodiment.

Although the Quiet Announcement frame 300 includes quieting control information in the frame body 308, quieting control information is included in a MAC header, in other embodiments. FIG. 4 is a diagram of an example frame 400 that a communication device in a WLAN generates and transmits to quiet the WLAN, according to an embodiment. In the example frame 400, quieting control information is included in a MAC header of the frame 400, as will be described in more detail below. The network interface device 122 of the AP 114 (FIG. 1) is configured to generate and transmit the frame 400 to quiet the WLAN, according to an embodiment. For instance, the quieting controller 142 is configured to control the network interface device 122 to generate and transmit the frame 400, according to an embodiment. The example frame 400 is described with reference to FIG. 1 merely for explanatory purposes, and the frame 400 is used with other suitable wireless communication networks and/or generated/transmitted/processed by other suitable wireless communication devices in other embodiments.

The frame 400 is useful, for example, for establishing a single time segment within a single beacon interval during which communication devices in a WLAN are to refrain from transmitting, according to some embodiments. For instance, the frame 400 includes quieting control information that indicates a single time segment during which communication devices in the WLAN are to refrain from transmitting. Multiple transmissions of the frame 400 are used to establish multiple aperiodic time segments during which communication devices in a WLAN are to refrain from transmitting, according to some embodiments.

The frame 400 includes a MAC header 404, a frame body 408, and an FCS field 412, according to an embodiment. The FCS field 412 includes error detection information (e.g., CRC information) corresponding to the MAC header 404 and the frame body 408, according to an embodiment.

The MAC header 404 includes a frame control field 416 having MAC layer information regarding the frame 400. The frame control field 416 includes a type subfield 420, a subtype subfield 424 and (optionally) a control frame extension subfield 428 set to indicate that the frame 400 is a management-type or control-type frame having a control field 432, according to an embodiment. In some embodiments, the control frame extension subfield 428 is omitted.

The MAC header 404 also includes an address field 436 that indicates an address of an intended receiver(s) of the frame 400. In an embodiment, the address field 436 is set to a broadcast address that indicates that the frame 400 is intended for all communication devices in the WLAN. In other embodiments, the address field 436 is set to a unicast address that indicates that the frame 400 is intended for a specific one communication device in the WLAN. In other embodiments, the address field 436 is set to a multicast address that indicates that the frame 400 is intended for a specific set of multiple communication devices in the WLAN, rather than all communication devices in the WLAN.

The control field 432 is configured to prompt one or more communication devices in the WLAN to refrain from transmitting during a time segment that begins upon an end of transmission of the frame 400 (or an end of transmission of a packet that includes the frame 400) and lasts for a duration indicated by the control field 432 (as will be described below). For example, in response to a receiver determining i) that the frame 400 is of a type/subtype (e.g., by analyzing the type subfield 420, and optionally the subtype subfield 424, and optionally the control frame extension subfield 428 (if included)) that includes the control field 432, and ii) that the control field 432 includes quieting control information, the receiver determines to refrain from transmitting during a time segment that begins upon an end of transmission of the frame 400 (or an end of transmission of a packet that includes the frame 400) and lasts for a duration indicated by the control field 432, as will be described below.

The control field 432 includes quieting control information, such as a quiet duration field 460. The quiet duration field 460 indicates (e.g., specifies) a time duration of the time segment during which communication device(s) in the WLAN are to refrain from transmitting. In an illustrative embodiment, the quiet duration field 460 is in units of TUs. In other embodiments, the quiet duration field 460 is in other suitable units (such as units less than or equal to a TU, less than or equal to 1000 microseconds, less than or equal to 500 microseconds, less than or equal to 100 microseconds, less than or equal to 50 microseconds, less than or equal to 10 microseconds, etc.). In another illustrative embodiment, the quiet duration field 460 is in units equaling 32 microseconds. In another illustrative embodiment, the quiet duration field 460 is in units equaling 1 microsecond.

In some embodiments, the control field 432 is a new variant of the high throughput (HT) control field, which is defined by the IEEE 802.11 Standard. For example, a plurality of bits of the HT control field may be set to indicate that the HT control field is a variant of the HT control field that includes quieting control information, according to an embodiment. In other embodiments, the control field 432 is a suitable control field other than a variant of the HT control field.

In some embodiments, the network interface device 122 is configured to (e.g., the MAC processor 126 is configured to, the quieting controller 142 is configured to, etc.) generate and transmit the frame 400, according to an embodiment.

In some embodiments, the network interface device 162 is configured to (e.g., the MAC processor 126 is configured to, the quieting controller 142 is configured to, etc.) process the frame 400 and, in response to processing the frame 400, control the network interface device 122 to refrain from transmitting during the time segment indicated (e.g., specified) by quieting control information in the control field 432, according to an embodiment.

Figure 5:
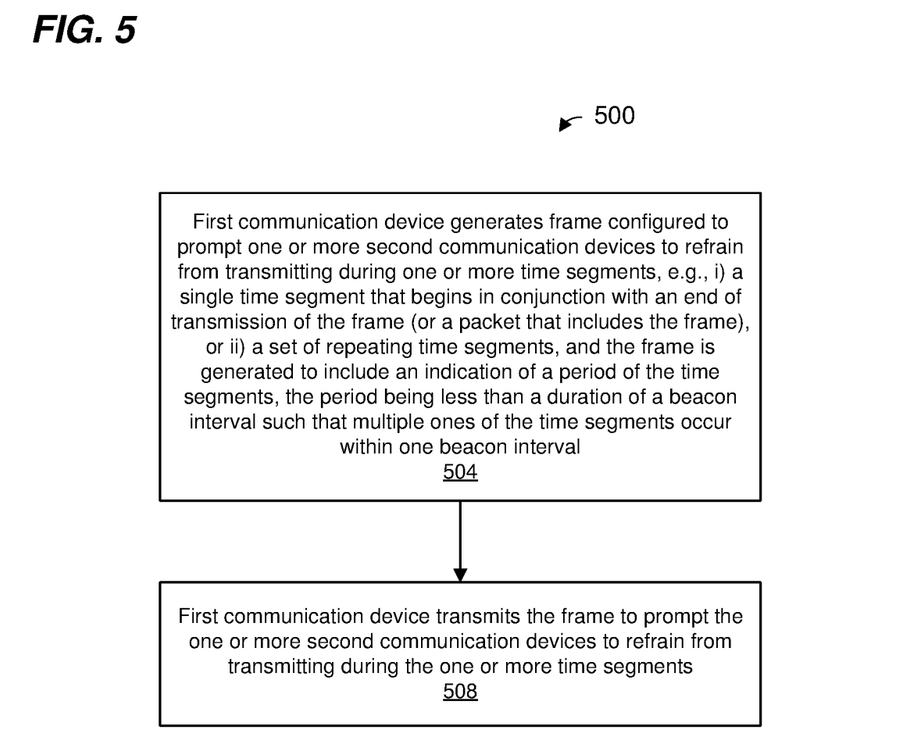
FIG. 5 is a flow diagram of an example method for quieting transmissions in a WLAN, according to an embodiment.

FIG. 5 is a flow diagram of an example method 500 for quieting transmissions in a WLAN, according to an embodiment. The method 500 is implemented by a communication device having a structure the same as or similar to the AP 114 of FIG. 1, and the method 500 is described with reference to FIG. 1 for ease of explanation. In other embodiments, however, the method 500 is implemented by a communication device having a suitable structure different than the AP 114 of FIG. 1.

At block 504, a first communication device generates (e.g., the network interface device 122 generates, the MAC processor 126 generates, the quieting controller 142 generates, etc.) a frame configured to prompt one or more second communication devices in the WLAN to refrain from transmitting during one or more time segments. In some embodiments, the frame generated at block 504 is configured to prompt the one or more second communication devices to refrain from transmitting during a time segment that begins in conjunction with an end of transmission of the frame (or a packet that includes the frame). In some embodiments, the frame includes information that specifies a duration of the time segment. In an embodiment, the frame generated at block 504 comprises the Quiet Announcement frame 300 (FIG. 3). In another embodiment, the frame generated at block 504 comprises the frame 400 (FIG. 4). In other embodiments, the frame generated at block 504 is another suitable frame different than the frame 300 and the frame 400.

In some embodiments, the frame generated at block 504 is configured to prompt the one or more second communication devices to refrain from transmitting during a set of repeating time segments, and the frame is generated at block 504 to include an indication of a period of the time segments. In some embodiments, the period indicated in the frame generated at block 504 is less than a duration of a beacon interval such that multiple ones of the time segments occur within one beacon interval. In an embodiment, the frame generated at block 504 comprises the management frame 200 (FIG. 2). In other embodiments, the frame generated at block 504 is another suitable frame different than the frame 200.

At block 508, the first communication device transmits (e.g., the network interface device 122 transmits, the PHY processor 130 transmits, etc.) a packet that includes the frame generated at block 504 to prompt the one or more second communication devices in the WLAN to refrain from transmitting during the one or more time segments. In some embodiments, transmitting the packet at block 508 comprises the MAC processor 126 controlling (e.g., the quieting controller 142 controlling) the PHY processor 130 to transmit the packet that includes the frame generated at block 504.

Figure 6:
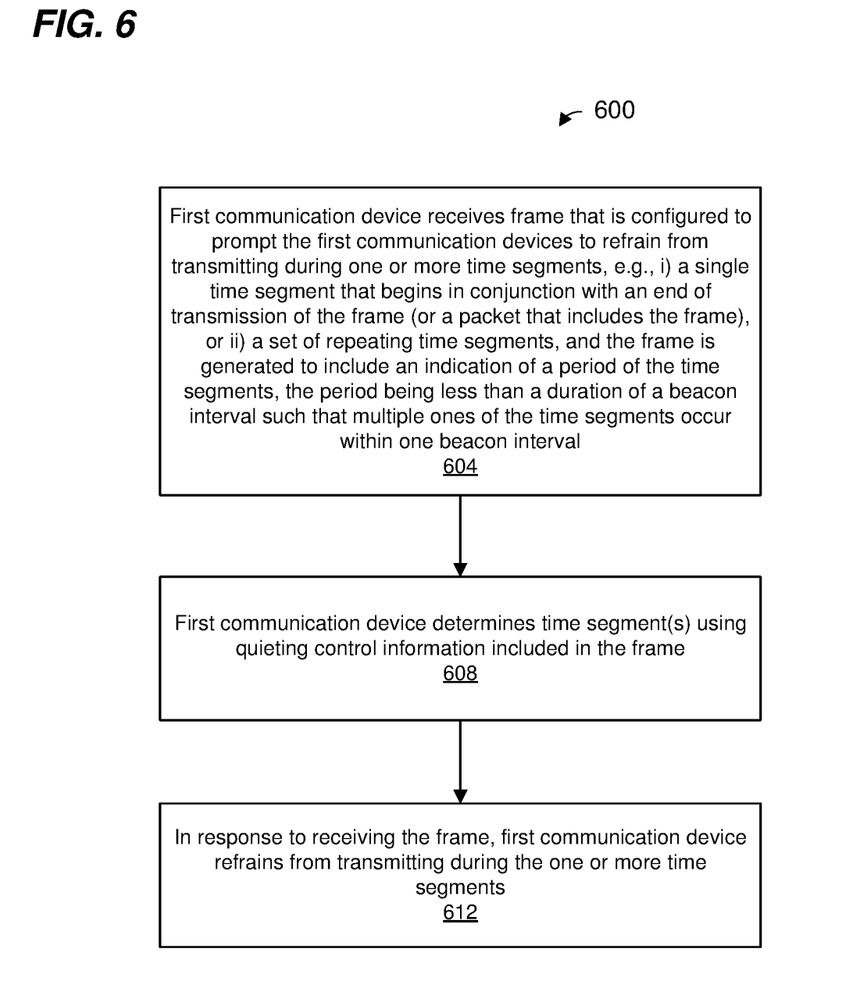
FIG. 6 is a flow diagram of another example method for quieting transmissions in a WLAN, according to another embodiment.

FIG. 6 is a flow diagram of an example method 600 for quieting transmissions in a WLAN, according to an embodiment. The method 600 is implemented by a communication device having a structure the same as or similar to the client station 154-1 of FIG. 1, and the method 600 is described with reference to FIG. 1 for ease of explanation. In other embodiments, however, the method 600 is implemented by a communication device having a suitable structure different than the client station 154-1 of FIG. 1.

At block 604, a first communication device receives (e.g., the network interface device 162 receives, the PHY processor 170 receives, the MAC processor 166 receives, etc.) a frame configured to prompt the first communication device to refrain from transmitting during one or more time segments, the frame being received from a second communication device. In some embodiments, the frame received at block 604 is configured to prompt the first communication device to refrain from transmitting during a time segment that begins in conjunction with an end of transmission of the frame (or a packet that includes the frame). In some embodiments, the frame includes information that specifies a duration of the time segment. In an embodiment, the frame received at block 604 comprises the Quiet Announcement frame 300 (FIG. 3). In another embodiment, the frame received at block 604 comprises the frame 400 (FIG. 4). In other embodiments, the frame received at block 604 is another suitable frame different than the frame 300 and the frame 400.

In some embodiments, the frame received at block 604 is configured to prompt the first communication device to refrain from transmitting during a set of repeating time segments, and the frame received at block 604 includes an indication of a period of the time segments. In some embodiments, the period indicated in the frame received at block 604 is less than a duration of a beacon interval such that multiple ones of the time segments occur within one beacon interval. In an embodiment, the frame received at block 604 comprises the management frame 200 (FIG. 2). In other embodiments, the frame received at block 604 is another suitable frame different than the frame 200.

At block 608, the first communication device determines (e.g., the network interface device 162 determines, the MAC processor 166 determines, the quieting controller 192 determines, etc.) the one or more time periods indicated by the frame received at block 604. For example, the first communication device determines (e.g., the network interface device 162 determines, the MAC processor 166 determines, the quieting controller 192 determines, etc.) the one or more time periods using quieting control information included in the frame received at block 604.

In some embodiments, the frame received at block 604 is configured to prompt the first communication device to refrain from transmitting during a time segment that begins in conjunction with an end of transmission of the frame (or a packet that includes the frame), and the frame received at block 604 includes duration information that specifies a duration of the time segment. In such embodiments, the first communication device determines (e.g., the network interface device 162 determines, the MAC processor 166 determines, the quieting controller 192 determines, etc.) the time period using the duration information in the frame received at block 604.

In some embodiments, the frame received at block 604 is configured to prompt the first communication device to refrain from transmitting during a set of repeating time segments, and the frame received at block 604 includes an indication of a period of the time segments. In such embodiments, the first communication device determines (e.g., the network interface device 162 determines, the MAC processor 166 determines, the quieting controller 192 determines, etc.) the set of repeating time periods using the indication of the period in the frame received at block 604. In some embodiments, the frame received at block 604 further includes an indication of a duration of each time segment in the set of repeating time segments, and the first communication device determines (e.g., the network interface device 162 determines, the MAC processor 166 determines, the quieting controller 192 determines, etc.) the set of repeating time periods further using the indication of the duration in the frame received at block 604. In some embodiments, the frame received at block 604 further includes an indication of a start time of the set of repeating time segments, and the first communication device determines (e.g., the network interface device 162 determines, the MAC processor 166 determines, the quieting controller 192 determines, etc.) the set of repeating time periods further using the indication of the start time in the frame received at block 604.

At block 612, the first communication device refrains (e.g., the network interface device 162 refrains, the PHY processor 170 refrains, etc.) from transmitting during one or more of the time segment(s) determined at block 608. In some embodiments, refraining from transmitting at block 612 comprises the MAC processor 166 controlling (e.g., the quieting controller 192 controlling) the PHY processor 130 to refrain from transmitting during one or more of the time segment(s) determined at block 608.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for quieting transmissions in a wireless local area network (WLAN), the method comprising:
   receiving, at a client station, a frame that is configured to prompt the client station to refrain from transmitting during a set of repeating time segments, wherein the frame includes an indication of a time period of the time segments in the set of repeating time segments, the time period being less than a duration of a beacon interval of the WLAN such that multiple ones of the time segments occur within one beacon interval;
   determining, at the client station, one or more time segments within the set of repeating time segments using the indication of the time period in the frame; and
   in response to receiving the frame, quieting a transceiver of the client station during the one or more determined time segments.

2. The method of claim 1, wherein:
   the frame includes a field specifying the time period, wherein the field is in units of less than 2000 microseconds; and determining the one or more time segments comprises using the field to determine the one or more time segments.

3. The method of claim 1, wherein:
the frame includes a field specifying a duration of each of the time segments in the set of repeating time segments, wherein the field is in units of less than 110 microseconds; and
determining the one or more time segments comprises using the field to determine the one or more time segments.

4. The method of claim 1, wherein:
the frame includes an indication of a starting time of a first occurring time segment in the set of repeating time segments; and
determining the one or more time segments comprises using the indication to determine the one or more time segments.

5. An apparatus, comprising:
a wireless network interface device associated with a client station and configured to operate in a wireless local area network (WLAN), the wireless having one or more integrated circuit (IC) devices configured to:
receive a frame that is configured to prompt the client station to refrain from transmitting during a set of repeating time segments, wherein the frame includes an indication of a time period of the time segments in the set of repeating time segments, the time period being less than a duration of a beacon interval of the WLAN such that multiple ones of the time segments occur within one beacon interval,
determine one or more time segments within the set of repeating time segments using the indication of the time period in the frame, and
in response to receiving the frame, quiet a transceiver of the client station during the one or more determined time segments.

6. The apparatus of claim 5, wherein:
the frame includes a field specifying the time period, wherein the field is in units of less than 2000 microseconds; and
the one or more IC devices are configured to use the field to determine the one or more time segments.

7. The apparatus of claim 5, wherein:
the frame includes a field specifying a duration of each of the time segments in the set of repeating time segments, wherein the field is in units of less than 110 microseconds; and
the one or more IC devices are configured to use the field to determine the one or more time segments.

8. The apparatus of claim 5, wherein:
the frame includes an indication of a starting time of a first occurring time segment in the set of repeating time segments; and
the one or more IC devices are configured to use the indication to determine the one or more time segments.

9. The apparatus of claim 5, wherein:
the wireless network interface device comprises one or more transceivers implemented using the one or more IC devices; and
the one or more IC devices are configured to, in response to receiving the frame, quiet the one or more transceivers during the determined one or more time segments.

10. A method for quieting transmissions in a wireless local area network (WLAN), the method comprising:
receiving, at a client station, a non-beacon control frame that is configured to prompt the client station to refrain from transmitting during a time segment that begins in conjunction with an end of transmission of i) the non-beacon control frame or ii) a packet that includes the non-beacon control frame, wherein the non-beacon control frame includes an indication of a time duration of the time segment;
determining, at the client station, the time segment using the indication of the time duration of the time segment; and
in response to receiving the non-beacon control frame, quieting a transceiver of the client station during the determined time segment.

11. The method of claim 10, wherein:
the non-beacon control frame includes a field specifying the time duration, wherein the field is in units of less than 100 microseconds; and
determining the time segment comprises using the field to determine to determine the time segment.

12. The method of claim 10, wherein:
the non-beacon control frame includes, in a media access control (MAC) header of the non-beacon control frame, a field specifying the time duration; and
determining the time segment comprises using the field to determine to determine the time segment.

13. The method of claim 12, wherein:
the non-beacon control frame includes the field specifying the time duration within a variant of a high throughput (HT) control field within the MAC header.

14. The method of claim 10, wherein:
the non-beacon control frame includes, in a media access control (MAC) body portion of the non-beacon control frame, a field specifying the time duration; and
determining the time segment comprises using the field to determine to determine the time segment.

15. An apparatus, comprising:
a wireless network interface device associated with a client station and configured to operate in a wireless local area network (WLAN), the wireless having one or more integrated circuit (IC) devices configured to:
receive a non-beacon control frame that is configured to prompt the client station to refrain from transmitting during a time segment that begins in conjunction with an end of transmission of i) the non-beacon control frame or ii) a packet that includes the non-beacon control frame, wherein the non-beacon control frame includes an indication of a time duration of the time segment,
determine the time segment using the indication of the time duration of the time segment, and
in response to receiving the non-beacon control frame, quiet a transceiver of the client station during the determined time segment.

16. The apparatus of claim 15, wherein:
the non-beacon control frame includes a field specifying the time duration, wherein the field is in units of less than 100 microseconds; and
the one or more IC devices are configured to use the field to determine the time segment.

17. The apparatus of claim 15, wherein the one or more IC devices are configured to:
the non-beacon control frame includes, in a media access control (MAC) header of the non-beacon control frame, a field specifying the time duration; and
the one or more IC devices are configured to use the field to determine the time segment.

18. The apparatus of claim 17, wherein:
the field specifying the time duration is included within a variant of a high throughput (HT) control field within the MAC header.

19. The apparatus of claim 15, wherein:
generate the non-beacon control frame to include, in a media access control (MAC) body portion of the non-beacon control frame, a field specifying the time duration; and
the one or more IC devices are configured to use the field to determine the time segment.

20. The apparatus of claim 15, wherein:
the wireless network interface device comprises one or more transceivers implemented using the one or more IC devices; and
the one or more IC devices are configured to, in response to receiving the non-beacon frame, quiet the one or more transceivers during the determined time segment.

* * * * *